US005895691A

United States Patent [19]

Boger et al.

[11] Patent Number: 5,895,691

[45] Date of Patent: Apr. 20, 1999

[54] IMMERSION CAN COATING APPARATUS AND METHOD

[75] Inventors: Bryan R. Boger, Brookville, Ind.; Joseph G. Vanden-Eynden, Hamilton, Ohio

[73] Assignee: Eagle-Picher Industries, Inc., Cincinnati, Ohio

[21] Appl. No.: 09/185,204

[22] Filed: Nov. 3, 1998

Related U.S. Application Data

[62] Division of application No. 08/781,480, Jan. 10, 1997, Pat. No. 5,858,098.

[51] Int. Cl.$^6$ .......... B01J 19/08

[52] U.S. Cl. .......... 427/457; 427/235; 427/239; 427/424; 427/435; 427/443.2; 427/598

[58] Field of Search .......... 427/598, 235, 427/239, 435, 443.2, 424, 457

*Primary Examiner*—Bernard Pianalto
*Attorney, Agent, or Firm*—Wood, Herron & Evans, LLP

[57] ABSTRACT

A magnetic conveyor system for transporting ferro-magnetic cans through an immersion or electro-immersion coating bath includes a magnetic infeed conveyor for transporting the cans toward an inlet end of the coating bath, a magnetic coating conveyor for removing the cans from the infeed conveyor and transporting them through the coating bath, and a magnetic outfeed conveyor for removing the cans from the coating conveyor at an outlet end of the coating bath. The magnetic coating conveyor includes an endless conveyor belt which defines inclined inlet and outlet runs relative to a surface of the coating bath. The cans are transported on the conveyor belt with a closed bottom of each can magnetically held to the conveyor belt and an open top of each can facing outwardly from the belt. The cans are transported into the coating bath at the inlet run with the closed bottom of each can entering the bath before the open top. At the outlet run, the cans emerge from the coating bath with the closed bottom of each can leading the open top. A series of spray nozzles are mounted near the bottom of the coating bath to direct pressurized coating composition into the open top of the cans for displacing trapped air within the cans and to ensure adequate coating.

5 Claims, 3 Drawing Sheets

IMMERSION CAN COATING APPARATUS AND METHOD

This application is a divisional of U.S. Ser. No. 08/781,480, filed on Jan. 10, 1997, U.S. Pat. No. 5,858,098, the disclosure of which is hereby incorporated by reference herein in its entirety.

FIELD OF THE INVENTION

The present invention relates generally to immersion coating apparatus and methods for coating hollow objects and, more particularly, to a magnetic conveyor system and method for transporting ferro-magnetic cans through an immersion coating bath.

BACKGROUND OF THE INVENTION

In an immersion coating process, the hollow object being coated is simply immersed in a coating bath which contains a pool of coating composition. As the hollow object is submersed in the coating composition, the coating flows into the object and adheres to its inner and outer surfaces. With an electro-immersion process, a potential is created between the object being coated and the coating composition, thereby causing the coating to preferentially adhere to inner and outer surfaces of the object being coated. Electro-coating is generally advantageous to simple immersion coating as it creates a physical attraction between the coating composition and the object being coated to ensure adequate coating.

Hollow objects such as open cans are typically electro-immersion coated and several patents discuss this process, including Jörgens U.S. Pat. No. 5,474,610. One problem with coating cans in an immersion process is that they are opened at only one end during the coating process. Thus, removing trapped air from within the cans as they are immersed in the coating is problematic, as is removing the coating from the can as it is withdrawn from the coating bath.

To address the problems associated with coating of hollow cans, the Jörgens reference discloses a method wherein the cans are sequentially transported through a coating bath by a double-sided conveyor system having upper and lower runs in contact with the open tops and closed bottoms of the cans. As the cans are immersed in the coating bath by the conveyor apparatus, a jet spray of coating composition is used to force coating material into the open tops of the cans, thereby displacing trapped air within the cans. The cans continue through the coating bath and pass underneath a second series of coating jet nozzles which further force coating composition into the can to ensure adequate coating. Finally, as the cans are withdrawn from the coating bath, air is injected into the can to ensure that all of the coating composition is removed.

An alternate method of addressing problems associated with coating hollow cans is to simply introduce the cans into the coating bath with the opening of the cans facing upwardly relative to a surface of the coating bath. As the cans are brought into the coating bath, coating liquid will flow into open tops of the cans and displace trapped air within the cans. The cans are then withdrawn from the coating bath with the opening of the cans facing downwardly relative to the coating bath surface to allow excess coating composition to pour out of the cans.

The conveyor apparatus disclosed in Jörgens does not provide the advantageous orientation of the open tops of the cans relative to the coating bath as it relies upon upper and lower conveyor belts to hold the cans in position to prevent them from floating away in the coating bath. With such a conveyor system, the upper and lower belts must move at the same speed or the cans will become tilted or even dislodged. For this reason, it is impossible for the apparatus disclosed in the Jörgens reference to transport cans and rotate them to the degree necessary to ensure that the openings are in the proper orientation as they enter and leave the coating bath to allow the coating to flow into and pour out of the can. This would require a change in the arc of the conveyor belts as they move, which in turn would cause them to move at different speeds.

The Jörgens reference refers to European Patent Application 0118756 which does disclose an apparatus which accomplishes upward orientation of the open tops of the cans as they enter the coating bath and downward orientation of the open tops as they are withdrawn from the bath. However, as the Jörgens reference indicates, the European patent application discloses a relatively complex circular conveyor system which grasps and manipulates the individual cans as they pass through the immersion bath. While such a conveyor apparatus does provide the advantageous orientation of the cans relative to the surface of the coating bath, the conveyor apparatus disclosed in the European patent application is generally not practical for rapid coating of a large number of cans.

SUMMARY OF THE INVENTION

Accordingly, it is an object of the present invention to provide a coating apparatus and method for immersion coating of open-ended cans which provide for introducing the cans into a coating bath with the can opening facing upwardly relative to a surface of the bath, and for withdrawing the cans from the bath with the can opening facing downwardly. More particularly, it is an object of the present invention to provide a coating apparatus and method for immersion coating of open-ended cans which provide for advantageous orientation of the open-ended cans throughout the coating process without requiring extensive manipulation of individual cans. It is yet another object of the present invention to provide a coating apparatus and method for immersion coating of open-ended cans which provide for rapid immersion coating of a large number of cans.

The objects of the present invention are achieved by employing a magnetic conveyor system which preferably comprises a magnetic infeed conveyor for transporting ferro-magnetic cans toward an inlet end of a coating bath, a magnetic coating conveyor for removing the cans from the infeed conveyor and transporting them through the coating bath, and a magnetic ouffeed conveyor for removing the cans from the coating conveyor at an outlet end of the coating bath. In accordance with the present invention, each of the magnetic infeed, coating and outfeed conveyors includes a continuous conveyor belt which runs over a series of planar magnetic beds and about magnetic rollers associated with the magnetic beds to respectively hold and turn the cans as they travel throughout the entire coating process.

In accordance with the coating apparatus and method of the present invention, the magnetic infeed conveyor is adapted to transport the cans toward the coating bath with an open top of the cans held to the infeed conveyor and a closed bottom of the cans facing away from the infeed conveyor. The magnetic coating conveyor is disposed at least partially in the coating bath and is adapted to remove the cans from the infeed conveyor at the inlet end and transport the cans through the coating bath. The magnetic coating conveyor transports the cans through the coating bath with the closed bottom of the cans held to the coating conveyor and the open tops of the cans facing away from the coating conveyor. The magnetic outfeed conveyor is adapted to remove the cans from the magnetic coating conveyor at the outlet end of the coating bath and transport the cans from the coating bath with the open tops of the cans held to the outfeed conveyor and the closed bottoms of the cans facing away from the outfeed conveyor. With this advantageous orientation of the cans as they are transported through the coating bath, the coating composition is allowed to flow into the open tops of the cans, thereby displacing trapped air within the cans, and then to pour out of the cans, thereby removing excess coating from the cans.

As the cans are transported through a bottom portion of the coating bath by the magnetic coating conveyor, the cans preferably move with their openings facing downwardly and directed toward a series of jet nozzles which further force coating composition into the cans to ensure adequate coating. Preferably, the present invention employs an electro-immersion process wherein the conveyor belt of the coating conveyor grounds the individual ferro-magnetic cans. The jet nozzles, in turn, carry an opposite charge relative to that of the cans to create an electrical potential between the cans and the coating composition. The electrical potential causes the coating composition to preferentially adhere to surfaces of the ferro-magnetic cans to ensure complete coating of the cans.

Preferably, the cans are transferred from one conveyor system to another by a magnetic force acting between parallel magnetic runs of adjacent conveyor systems. That is, the cans are magnetically transferred from the infeed conveyor to the coating conveyor at the inlet end, and from the coating conveyor to the outfeed conveyor at the outlet end.

The objects and advantages of the present invention will be further appreciated in light of the following detailed description and drawings in which:

DETAILED DESCRIPTION OF SPECIFIC EMBODIMENTS

Figure 1:
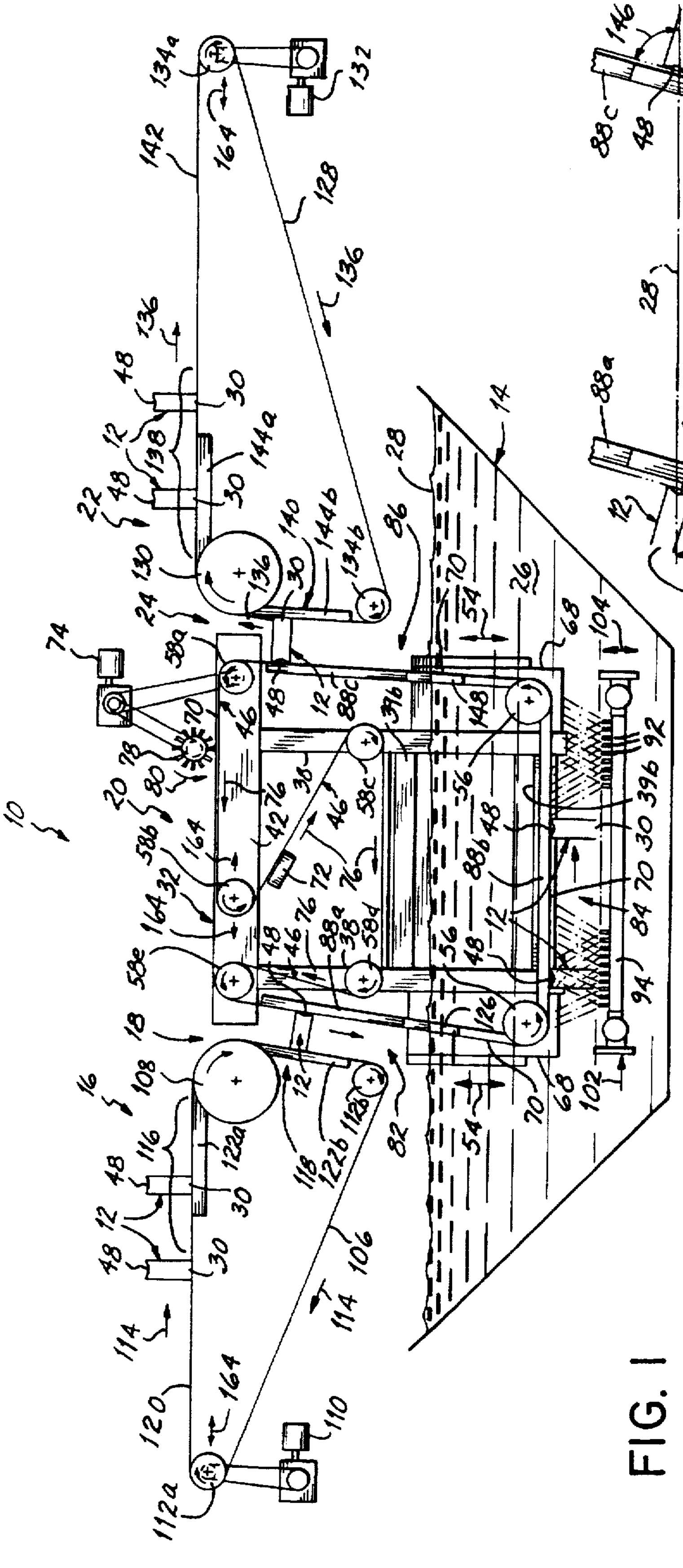
FIG. 1 is a diagrammatic side view of a magnetic conveyor system in accordance with the present invention, including in-line magnetic infeed, coating and outfeed conveyors, for moving ferro-magnetic cans through an immersion coating bath.

With reference to the figures, and to FIG. 1 in particular, a magnetic conveyor system 10 is shown in accordance with the present invention for immersion coating of ferro-magnetic cans 12 in a coating bath 14. Magnetic conveyor system 10 preferably includes a magnetic infeed conveyor 16 for transporting the cans 12 toward an inlet end 18 of the coating bath 14, a magnetic coating conveyor 20 for removing the cans from the infeed conveyor and transporting them through the coating bath, and a magnetic outfeed conveyor 22 for removing the cans, now adequately coated, from the coating conveyor at an outlet end 24 of the coating bath. In accordance with the present invention, the cans 12 are immersion coated with a coating composition, shown generally by numeral 26, as the cans are transported below a surface 28 of the coating composition by the magnetic coating conveyor 20 as will be described in greater detail below.

The present invention is adapted for immersion coating of cans 12 in the coating bath 14, wherein the coating composition 26 flows into and pours out of an open top 30 in each of cans, and also for electrocoating of the cans wherein an electrical potential is created between the cans and the coating bath to cause the coating composition to preferentially adhere to inner and outer surfaces of the can. Where the present invention is used for electro-coating of cans 12, the coating composition 26 carries an electrical charge which is opposite to that carried by the cans 12 as will be described in more detail below.

As shown most clearly in FIG. 2, the magnetic coating conveyor 20 includes a support frame 32 which is mounted to side walls 34 of the coating bath through a pair of support rails 36 as will be described in more detail below. The support frame 32 preferably includes two pairs of upstanding or vertical side members 38, with each of the pairs being located on opposite sides of the support frame. In one embodiment, the opposite pairs of vertical side members 38 are preferably joined by two pairs of vertically spaced, transverse members 39*a*. Preferably, the vertical side members 38 and transverse members 39*a* comprise 2"×4"×¼" #304 S.S. tubes.

The vertical side members 38 are also preferably joined on each side of the support frame 32 by a pair of vertically spaced, cross members 39*b* comprising 2"×4"×3/16" formed #304 S.S. channels. The vertical side members 38 and cross members 39*b* support vertical side plates 40 (one shown) on each side of the support frame 32. The upper ends of the vertical side members 38 additionally support horizontal side members 42, comprising 3"×8"×3/16" formed #304 S.S. channels, extending longitudinally on each side of the support frame 32. The horizontal side members 42 are preferably joined by a pair of horizontally spaced, transverse members 44 which comprise 2"×4"×¼" #304 S.S. tubes. While one embodiment of the support frame 32 has been shown described in detail, those skilled in the art will appreciate that other frame structures are readily available for providing the necessary support of the magnetic coating conveyor 20 without departing from the scope and spirit of the present invention.

The support frame 32 is adapted to rotatably support an endless conveyor belt 46 which travels through the coating bath 14 as will be described in more detail below. In accordance with the invention, the endless conveyor belt 46 is adapted to hold a closed bottom 48 of the cans 12 (see FIG. 1) and transport them, in side-by-side lanes (e.g., four side-by-side lanes not shown), through the coating bath 14 between the inlet and outlet ends 18 and 24, respectively. The support frame 32 includes a series of threaded bolts 50 which extend from braces 52 located on each of the vertical side members 38. The threaded bolts 50 engage the support rails 36 located on either side of the coating bath 14 to provide vertical adjustability of the magnetic coating conveyor 20 relative to the coating bath 14. The support frame 32 and, thus, the endless conveyor belt 46, are vertically adjustable relative to the surface 28 of the coating composition 26, as shown diagrammatically by arrows 54 in FIG. 1, through adjustment of the threaded bolts 50.

To support the endless conveyor belt 46, the support frame 32 rotatably carries a pair of magnetic rollers 56, preferably manufactured by Walker Magnetics of Worcester, Mass., below the surface 28 of the coating bath 14, and rollers 58*a–e* for either driving or tensioning the conveyor belt about the magnetic rollers 56. As will be described in more detail below, roller 58*a* rotatably drives the conveyor belt 46, while the other rollers 58*b–e* provide tension to the conveyor belt for rotation about the magnetic rollers 56.

Figure 3:
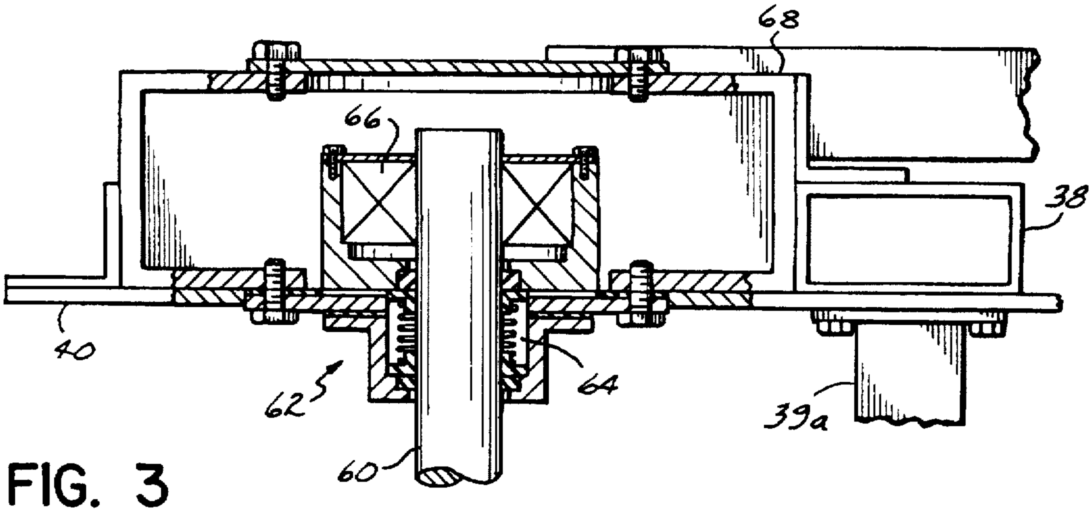
FIG. 3 is an enlarged partially broken-away top plan view of an outer shaft bearing for supporting a magnetic roller of the magnetic coating conveyor of FIG. 1.

Referring to FIG. 3, each of the magnetic rollers 56 has a horizontally disposed shaft 60 which is supported at its opposite ends by end bearings, shown generally by numeral 62, mounted to each of the vertical side plates 40 of support frame 32 below the surface 28 of the coating composition 26. Each magnetic roller end bearing 62 has an inner double shaft seal 64 to prevent the coating composition 26 from entering the bearing, and an outer pressed-in bearing 66 which is vented to atmosphere through an upstanding or vertical vent tube 68 located at each outer bearing 66. The vent tubes 68 form vertically disposed tubular chambers within the coating bath 14 which extend from an outboard side of each pressed-in bearing 66 to atmosphere above the surface 28 of the coating composition 26.

The endless conveyor belt 46 preferably comprises an open ½"×1" stainless steel flat wire belt (#304 or #316 stainless steel) (see FIG. 4) having a width approximately equal to the width of the magnetic rollers 56. A suitable conveyor belt for use in the present invention is available from Ashworth Brothers, Inc. of Winchester, Va. The conveyor belt 46 preferably includes a knurled top surface 70 for contacting the closed bottoms 48 of the cans 12 as will be described in greater detail below. Where the present invention is used for electrocoating of the cans 12, the conveyor belt 46 is preferably coated with a non-conductive coating (chemically compatible with the coating composition 26), with the top surface 70 of the conveyor belt left exposed or uncoated to provide a conductive contact with the closed bottoms 48 of the cans and a series of "anode" grounding shoes 72, preferably manufactured by Delta Star of Lynchburg, Va.

A drive motor 74 is connected to roller 58*a* for driving the conveyor belt 46 in the direction represented by arrows 76 about the magnetic rollers 56 and rollers 58*a–e*. The magnetic conveyor assembly 20 preferably includes a wire conveyor belt brush 78, such as manufactured by Fuller Brush Co. of Great Bend, Kans., to remove coating material which may be deposited on the top surface 70 of the conveyor belt 46 as it travels through the coating bath 14. The conveyor belt brush 78 is driven by the drive motor 74 in direction, represented by arrow 80, which is opposite to the direction 76 of conveyor belt 46.

Figure 2:
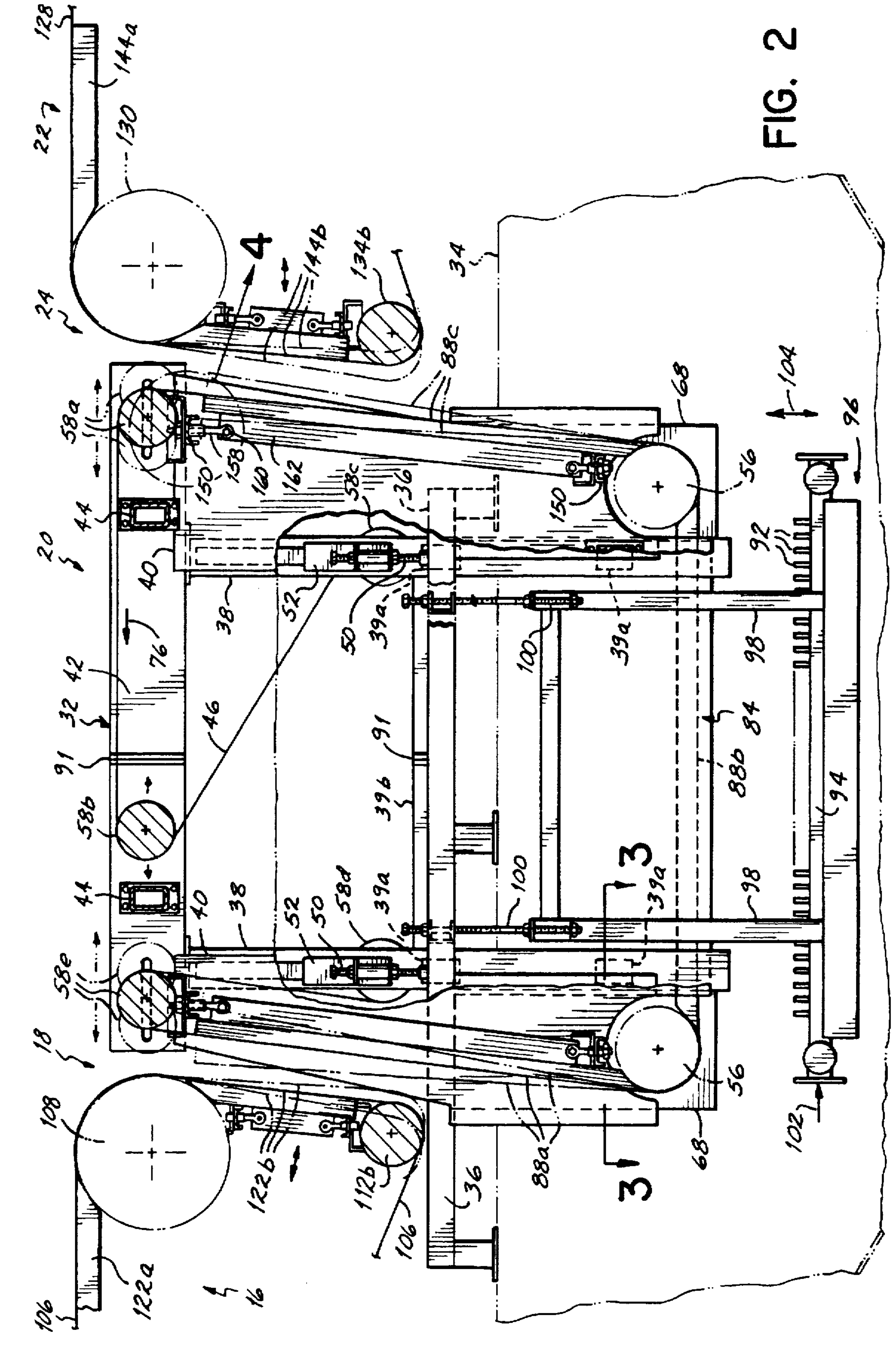
FIG. 2 is an elevational side view, partially broken away, showing in greater detail the magnetic conveyor system of FIG. 1.

As shown in FIGS. 1 and 2, the endless conveyor belt 46 defines an inclined inlet run 82 at the inlet end 18 of the coating bath 14, a substantially horizontal run 84 near the bottom of the bath, and an inclined outlet run 86 at the outlet end 24 of the bath. Planar magnetic beds 88*a–c*, preferably manufactured by Walker Magnetics of Worcester, Mass. are mounted beneath the top surface 70 of each of the conveyor runs 82, 84, and 86, respectively, and cooperate with the magnetic rollers 56 to define a substantially continuous magnetic run extending beneath the conveyor belt 46 between the inlet and outlet ends 18 and 24 of the coating bath 14. In this way, the closed bottoms 48 of cans 12 are magnetically held to the conveyor belt 46, with the open tops 30 of the cans facing away from the belt as the cans travel through the coating bath 14.

To prevent the conveyor belt 46 from sagging or becoming separated from the magnetic bed 88*b* along the horizontal run 84, thereby possibly losing the magnetic attraction between the magnetic bed 88*b* and the closed bottoms 48 of the cans 12 along the horizontal run, the stainless steel conveyor belt, which is itself non-magnetic, includes a series of spaced pivot rods 90 (see FIG. 4) preferably made of magnetic Series 400 stainless steel, in combination with non-magnetic pivot rods 90*a*, to provide magnetic attraction between the pivot rods 90 and the magnetic bed 88*b*. Thus, the magnetic attraction between the magnetic conveyor rods 90 and the magnetic bed 88*b* is sufficient along the horizontal run 84 to prevent the conveyor belt 46 from sagging along the horizontal run.

Preferably, the magnetic coating conveyor 20 is separable into two halves to allow for increase in the longitudinal length of the coating conveyor and, thus, increase the dwell time of the cans 12 within the coating bath 14. To accomplish this, the horizontal side members 42, cross members 39*b* and vertical side plates 40 of the support frame 32 may be split approximately midway as at 91 of the support frame so that additional frame pieces, up to five feet in length, for example, may be added to increase the length of the magnetic coating conveyor. Likewise, the magnetic bed 88*b* may be split approximately midway of the bed, and an additional piece, also up to five feet in length, may be added to the magnetic bed. Additional length is also provided to the conveyor belt 46 to accommodate for the change in length of the magnetic coating conveyor 20.

With further reference to FIGS. 1 and 2, a series of spray nozzles 92 are mounted on a coating manifold 94 located near the bottom of the coating bath 14. The coating manifold 94 is supported on a frame 96 which is mounted through vertical frame members 98 to the support rails 36 located on the side walls 34 of the coating bath 14. The frame 96 is vertically adjustable relative to the horizontal run 84 through a series of threaded bolts 100 which connect the vertical frame members 98 to the support rails 36. The coating manifold 94 includes a separate bank or series of spray nozzles 92 for each of the four lanes of cans 12. As the cans 12 travel along the horizontal run 84, the spray nozzles 92 are arranged to spray the coating composition 26 into the open tops 30 of the cans. In this way, the pressurized coating composition 26 supplied by the spray nozzles 92 further displaces air which may be trapped within the cans 12 to ensure adequate coating of the cans.

During electro-coating of the cans 12, the coating manifold 94 and spray nozzles 92 are electrically coupled to a "cathode", shown diagrammatically by arrow 102, to charge the coating composition 26 with a charge opposite to that carried by the cans 12 as a result of their electrical contact through the conveyor belt 46 with the "anode" grounding shoes 72. It will be appreciated by those skilled in the art that the "anode" and "cathode" connections are reversible depending on the formulation of the coating composition 26. The magnetic rollers 56 are preferably coated with non-conductive material, such as vulcanized rubber, to prevent the coating composition 26 from being electro-coated to the magnetic rollers. Additionally, the magnetic beds 88a-c are preferably wrapped with a non-conductive, low friction wear tape, such as an ultra high molecular weight polyethylene or polypropylene tape, to prevent electro-coating of the magnetic beds.

As is well known in the art, the electrical potential created between the cans 12 and the coating composition 26 in the electro-immersion process causes the coating composition to preferentially adhere to charged surfaces of the cans. In this way, hard to reach surfaces of the cans 12 are adequately coated with coating composition 26 which may not be the case with a simple immersion coating process.

To further improve the coating process, the coating manifold 94 is preferably vertically adjustable relative to the horizontal run 84, as shown diagrammatically by arrows 104 in FIGS. 1 and 2, through adjustment of the threaded bolts 100. In this way, the gap distance between the spray nozzles 92 and the open tops 30 of the cans 12 may be reduced along the horizontal run 84 to effectively increase the pressure of the sprayed composition 26 into the cans. It will be appreciated that vertical adjustability of the coating manifold 94 also accommodates cans of varying heights as will be described in more detail below.

In accordance with the present invention as shown in FIGS. 1 and 2, the infeed conveyor 16 is provided adjacent the inlet end 18 of the magnetic coating conveyor 20 for transferring the cans 12 to the coating bath 14. The infeed conveyor 16 is particularly adapted to transport the cans 12 in side-by-side lanes (e.g., four side-by-side lanes, not shown) from upstream processing apparatus such as can washers and driers, and to transport them in preferred orientation so that they may be transferred to the inlet run 82 of the magnetic coating conveyor 20 as will be described in more detail below.

The infeed conveyor 16 preferably includes an endless conveyor belt 106 which is tensioned about a magnetic roller 108 mounted near the inlet end 18 of the magnetic coating conveyor 20. A drive motor 110 is connected to roller 112*a* for driving the conveyor belt 106 about the magnetic roller 108 in a direction represented by arrows 114. A second roller 112*b* serves to tension the conveyor belt 106 about the magnetic roller 108.

The infeed conveyor 16 preferably defines a substantially horizontal run 116 and an inclined run 118 which is substantially parallel to the inclined inlet run 82 of the magnetic coating conveyor 20. The conveyor belt 106 is also preferably made of stainless steel and has a knurled top surface 120 for contacting the open tops 30 of cans 12 as they are transported from upstream processing apparatus. It is also contemplated in other embodiments of the present invention that the conveyor belt 106 could have a smooth top surface rather than a knurled top surface, or even be replaced with a plastic conveyor belt without departing from the spirit and scope of the present invention. Magnetic beds 122*a* and 122*b* are mounted beneath portions of the horizontal and inclined runs 116 and 118, respectively, and cooperate with the magnetic roller 108 to define a substantially continuous magnetic run for turning the cans 12 at least 90°, and preferably more than 90°, at the inlet end 18 of the magnetic coating conveyor 20.

In operation of the present invention at the inlet end 18, the infeed conveyor 16 transports the cans 12 along the horizontal run 116 of the conveyor belt 106, with the open tops 30 of the cans being magnetically held to the belt and the closed bottoms 48 facing outwardly. As the cans 12 travel along the continuous magnetic run defined by the magnetic beds 122*a–b* and the magnetic roller 108, the cans are rotated preferably more than 90° from the horizontal run 116 to the inclined run 118.

The magnetic bed 88*a* extending along the inclined inlet run 82 of magnetic coating conveyor 20 preferably has an approximately twenty-percent (20%) greater magnetic pull (e.g., 500 grams of pull per can) than that of the magnetic bed 122*b* extending along the inclined run 118 of the infeed conveyor 16. As the cans 12 are preferably turned more than 90° about the magnetic roller 108, the stronger magnetic pull of the magnetic bed 88*a* causes the cans 12 to magnetically transfer from the inclined run 118 of the infeed conveyor 16 to the inclined inlet run of the magnetic coating conveyor 20, with the closed bottoms 48 of the cans now being held by the magnetic conveyor belt 46 along the inlet run 82.

Figure 5:
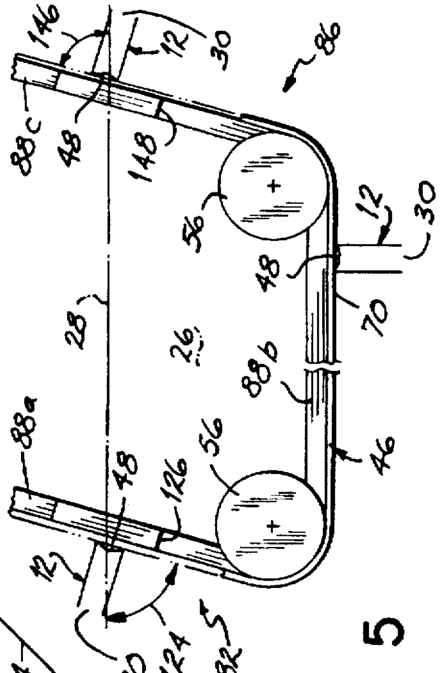
FIG. 5 is a diagrammatic side view of the magnetic coating conveyor of FIG. 1, showing in greater detail the entry and exit orientations of the cans relative to a surface of the coating bath.

As shown most clearly in FIG. 5, after the magnetic transfer has been completed, the cans 12 travel toward the coating bath 14 along the inlet run 82 of the magnetic coating conveyor. The inlet run 82 is preferably inclined at an angle, represented by numeral 124, between about 80° and about 90° relative to the surface 28 of the coating composition 26 such that the closed bottoms 48 enter the coating bath 14 before open tops 30. In this way, the coating composition 26 flows into the open tops 30 of the cans 12 and displaces any air which may be trapped within the cans.

To overcome the buoyancy effect caused by the entrance angle of the can 12 relative to the surface 28 of the coating composition 26, the magnetic bed 88*a* includes a 12" to 24" band of strong rare earth magnets 126 extending partially above and partially below the surface of the coating composition to pull the cans 12 into the coating composition without becoming dislodged from the conveyor belt 46. Preferably, the band of strong magnets 126 provides about 1,400 grams of pull per can to adequately secure the cans 12 to the conveyor belt 46 as they enter the coating composition 26.

With further reference to FIGS. 1 and 2, the outfeed conveyor 22 is provided adjacent the outlet end 24 of the magnetic coating conveyor 20 for transporting the cans 12 from the coating bath 14. The outlet conveyor 22 is particularly adapted to remove the cans 12, now adequately coated, in side-by-side lanes from the inclined outlet run 86 of the magnetic coating conveyor 20 and to transport them to further downstream processing apparatus, including can rinsers, driers, labelers or imprinters, for example.

The outfeed conveyor 22 preferably includes an endless conveyor belt 128 which is tensioned about a magnetic roller 130 mounted near the outlet end 24 of the magnetic coating conveyor 20. A drive motor 132 is connected to a roller 134*a* for driving the conveyor belt 128 about the magnetic roller 130 in a direction represented by arrows 136. A second roller 134*b* serves to tension the conveyor belt 128 about the magnetic roller 130.

The outfeed conveyor 22 preferably defines a substantially horizontal run 138 and an inclined run 140 which is substantially parallel to the inclined outlet run 86 of the magnetic coating conveyor 20. The conveyor belt 128 is also preferably made of stainless steel and has a knurled top surface 142 for contacting the open tops 30 of the cans 12 as they are transferred from the inclined outlet run 86 of the magnetic coating conveyor 20 to the inclined run 140 of the outfeed conveyor 22. Smooth, non-knurled stainless steel conveyors and plastic conveyors are also contemplated. Magnetic beds 144*a–b* are mounted beneath portions of the horizontal and inclined runs 138 and 140, respectively, and cooperate with the magnetic roller 130 to define a substantially continuous magnetic run for turning the cans 12 preferably less 90° at the outlet end 24 of the magnetic coating conveyor 20.

The magnetic bed 144*b* extending along the inclined run 140 of the outfeed conveyor 22 preferably has an approximately twenty-percent (20%) greater magnetic pull (e.g., 500 grams of pull per can) than that of the magnetic bed 88c extending along the inclined outlet run 82 of the magnetic coating conveyor 20. As the cans 12 emerge from the coating bath 14 and travel along the outlet run 82, the stronger magnetic pull of the magnetic bed 144b causes the cans 12 to magnetically transfer from the outlet run of the magnetic conveyor assembly 20, with the open tops 30 of the cans now magnetically held by the conveyor belt 128 along the inclined run 140.

In operation of the present invention at the outlet end 18, the outfeed conveyor 22 transports the cans 12 along the inclined run 140 of the conveyor belt 128 with the open tops 30 of the cans held magnetically to the belt and the closed bottoms 48 facing outwardly. As the cans 12 travel along the continuous magnetic run defined by the magnetic beds 144a–b and the magnetic roller 130, the cans are preferably rotated less than 90° from the inclined run 140 to the horizontal run 138.

As shown most clearly in FIG. 5, the outlet run 86 is preferably inclined at an angle, represented by numeral 146, between about 80° and about 90° relative to the surface 28 of the coating composition 26 such that the closed bottoms 48 of the cans 12 exit the coating bath 14 before the open tops 30. In this way, excess coating composition 20 pours out of the open tops 30 of the cans 12 as they emerge from the coating bath 14.

To overcome the negative buoyancy effect caused by the exit angle of the can 12 relative to the surface 28 of the coating composition 26, the magnetic bed 88c includes a 12" to 24" band of strong rare earth magnets 148 extending partially above and partially below the surface of the coating composition to prevent the cans 12 from becoming dislodged from the conveyor belt 46 as they emerge from the coating bath 14. Preferably, the band of magnets 148 provides about 1,400 grams of pull per can to secure the cans 12 to the conveyor belt 46 along the inclined outlet run 86.

Figure 4:
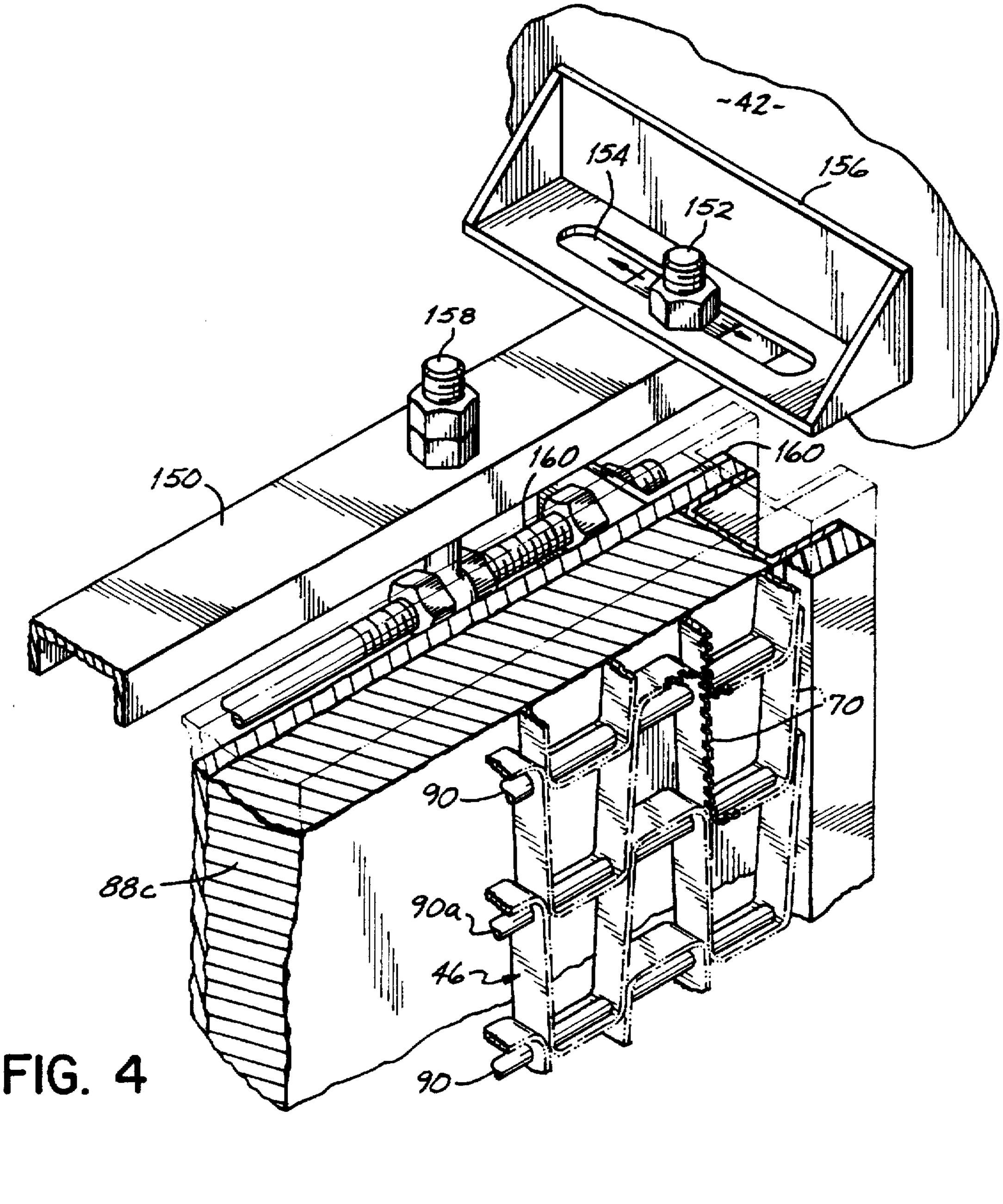
FIG. 4 is an enlarged perspective view of the incircle shown in FIG. 2, showing in greater detail adjustment of the planar magnetic beds of the magnetic coating conveyor.

As shown most clearly in FIGS. 2 and 4, the parallel magnetic beds 122b and 88a of the infeed and coating conveyors 16 and 20, respectively, are preferably adjustable to accommodate different entrance angles of the cans 12 (relative to the surface 28 of the coating composition 26) at the inlet end 18. Likewise, the parallel magnetic beds 88c and 144b of the coating and outfeed conveyors 20 and 22, respectively, are also preferably adjustable to accommodate different exit angles of the cans 12 at the outlet end 24. While FIG. 4 illustrates structure for providing adjustment of the magnetic bed 88c at the outlet end 24 of the magnetic coating conveyor 20, it will be appreciated that similar structure is provided at the inlet end 18, infeed conveyor 16 and outfeed conveyor 22 for providing variable adjustment of the respective parallel magnetic beds.

In particular with reference to FIG. 4, the support frame 32 of magnetic coating conveyor 20 carries upper and lower channels 150 (only the upper channel is shown) for each of the magnetic beds 88a and 88c which extend between opposite sides of the support frame. The upper and lower channels 150 are slidably secured to the support frame 32 through bolts 152 which extend through slots 154 in brackets 156 (one shown) mounted to each side of the support frame. The channels 150 are thus slidably adjustable along the longitudinal axis of the magnetic coating conveyor 20 as the bolts 152 travel in the slots 154 within the brackets 156. Each of the channels 150 supports a pair of swing eye bolts 158 (one shown) which carry a transverse rod 160. The transverse rod 160 is connected to opposite ends of the magnetic bed 88c through brackets 162 mounted to a rearward surface of the magnetic bed.

As shown most clearly in FIG. 2, parallel magnetic beds 122b and 88a, and parallel magnetic beds 88c and 144b, are adapted to variably tilt for providing varying entrance and exit angles of the cans 12 at the inlet and outlet ends 18 and 24. This is accomplished simply by adjusting the longitudinal position of the upper and lower channels 150 through repositioning of the bolts 152 within slots 154, and also by adjusting the vertical position of the transverse rods 160 through swing eye bolts 158. To accommodate for adjustments made to the parallel magnetic beds 122b and 88a, and to the parallel magnetic beds 88c and 144b, rollers 112a, 58a, *b* and *e*, and 134a are adapted to shift laterally, as represented by arrows 164, to maintain proper positioning and tensioning of the conveyor belts 106, 46 and 128, respectively.

The magnetic conveyor system 10 is further adapted to accommodate cans of different heights through the coating process. In one embodiment (not shown), the magnetic infeed conveyor 16 and magnetic outfeed conveyor 22 are each supported on wheels whereby horizontal movement of the infeed and ouffeed conveyors toward or away from the magnetic coating conveyor 20 results in a change of spacing between the conveyors 16, 20 and 22 at the respective inlet and outlet ends 18 and 24. After the desired spacing between the conveyors has been achieved at the inlet and outlet ends 18 and 24, further adjustments to the entrance and exit angles of the cans 12 may be made, as described in detail above, to optimize the coating process for the specific can size.

In accordance with a preferred method of the present invention, the cans 12 are magnetically held and transported on the conveyor belt 106 of the infeed conveyor 16 with the open tops 30 of the cans held to the conveyor belt and the closed bottoms 48 facing outwardly. The cans 12 are preferably turned more than 90° about the magnetic roller 108 by the infeed conveyor 16 from the horizontal run 116 to the inclined run 118 and transferred to the inlet run 82 of the magnetic coating conveyor 20. The cans 12 are preferably magnetically held to the conveyor belt 46 of the magnetic coating conveyor 20 with the closed bottoms 48 of the cans held to the belt and the open tops 30 facing away.

The cans 12 are preferably transported into the coating bath 14 at an angle relative to the surface 28 of the coating composition 26 so that an edge of the closed bottoms 48 of the cans enters the coating bath before an edge of the open tops 30 of the cans. Alternatively, in an embodiment not shown, the cans 12 may be introduced into the coating bath 14 in such an orientation that an edge of the closed bottoms 48 of the cans enters the coating bath at the same time as an edge of the open tops 30 of the cans. In either embodiment, the cans 12 are immersed in the coating bath 14 so that the coating composition 26 flows into the open tops 30 of the cans and displaces any trapped air within the cans. Coating composition 26 is sprayed into the open tops 30 of the cans 12 to ensure adequate coating. During electro-immersion, an electrical potential is created between the cans 12 and the coating composition 26 to preferentially adhere the coating composition to surfaces of the cans.

The cans 12 are then preferably transported from the coating bath 14 along the outlet run 86 at an angle relative to the surface 28 of the coating composition 26 so that an edge of the closed bottoms 48 of the cans exits the coating bath before an edge of the open tops 30 of the cans. This allows excess coating composition to pour from the cans after the coating process. Alternatively, in an embodiment not shown, the cans 12 may be transported from the coating bath 14 in such an orientation that an edge of the closed bottoms 48 of the cans exits the coating bath at the same time as an edge of the open tops 30 of the cans.

As the cans exit the coating composition 26, they are transferred from the outlet run 86 of the magnetic coating conveyor to the inclined run 140 of the outfeed conveyor 22. The conveyor belt 128 of the outfeed conveyor 22 is adapted to magnetically hold and transport the cans 12 with the open tops 30 of the cans held to the conveyor belt and the closed bottoms 48 facing outwardly. The cans 12 are preferably turned less than 90° about the magnetic roller 130 by the outfeed conveyor 22 from the inclined run 140 to the horizontal run 138 and carried away from the coating bath 14.

Those skilled in the art will readily appreciate that the present invention provides a coating apparatus and method for immersion coating of open-ended cans which provide advantageous orientation of the cans 12 throughout the coating process wherein the cans are introduced into the coating bath 14 with the open tops 30 facing upwardly relative to the surface 28 of the coating composition 26, and are withdrawn from the bath with the open tops facing downwardly. The present invention thus provides advantageous orientation of the open-ended cans 12 throughout the coating process without requiring extensive manipulation of individual cans and also provides for rapid coating of a large number of cans.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, it is contemplated that modifications to angles of the inlet and outlet runs 82 and 86 may be made without departing from the spirit and scope of the present invention. In another embodiment not shown, the magnetic infeed and outfeed conveyors may be replaced with other well known conveyor systems for transporting the cans 12 to and from the coating bath 14. The invention in its broader aspects is therefore not limited to the specific details, representative apparatus and method, and illustrative example shown and described. Accordingly, departures may be made from such details without departing from the spirit or scope of applicants' general inventive concept.

Having described the invention, we claim:

1. A method of coating ferro-magnetic cans in a coating bath, comprising the steps of:
   - magnetically holding and transporting said cans on a traveling conveyor belt with a closed bottom of said cans held to said belt and an open top of said cans facing away from said belt;
   - transporting said cans into said coating bath at an angle relative to a surface of said bath whereby an edge of said closed bottoms of said cans enters said bath before an edge of said open tops of said cans;
   - immersing said cans in said coating bath whereby coating flows into said open tops of said cans and displaces air in said cans; and
   - transporting said cans from said coating bath at an angle relative to the surface of said bath whereby an edge of said closed bottoms of said cans exits said bath before an edge of said open tops of said cans.
2. The method claimed in claim 1, further comprising creating an electrical potential between said cans and said coating.
3. The method claimed in claim 1, further comprising spraying coating into said open tops of said cans while said cans are immersed in said coating bath.
4. The method claimed in claim 1, further comprising:
   - magnetically holding and transporting said cans along an infeed conveyor toward said coating bath; and
   - transferring said cans from said infeed conveyor to said traveling conveyor belt for transporting said cans into said coating bath.
5. The method claimed in claim 1, further comprising:
   - transferring said cans from said traveling conveyor belt to an outfeed conveyor; and
   - magnetically holding and transporting said cans along said outfeed conveyor away from said coating bath.

* * * * *